(12) United States Patent
Laimboeck et al.

(10) Patent No.: US 10,605,163 B2
(45) Date of Patent: *Mar. 31, 2020

(54) POWER UNIT

(71) Applicant: Obrist Technologies GmbH, Lustenau (AT)

(72) Inventors: Franz Laimboeck, Thal (AT); Frank Obrist, Bregenz (AT); Tsuneo Konno, Tokyo (JP)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,491

(22) Filed: Nov. 16, 2018

(65) Prior Publication Data

US 2019/0085761 A1    Mar. 21, 2019

Related U.S. Application Data

(63) Continuation of application No. 15/518,628, filed as application No. PCT/EP2015/072197 on Sep. 28, 2015, now Pat. No. 10,132,237.

(30) Foreign Application Priority Data

Oct. 16, 2014   (DE) .................. 10 2014 115 042

(51) Int. Cl.
    *F02B 63/04* (2006.01)
    *F02B 67/06* (2006.01)
    (Continued)

(52) U.S. Cl.
    CPC ............ *F02B 63/04* (2013.01); *B60K 6/24* (2013.01); *F01B 1/10* (2013.01); *F02B 67/06* (2013.01);
    (Continued)

(58) Field of Classification Search
    USPC ..... 123/2, 3, 339.18, 406.58, 179.28, 192.1, 123/192.2; 60/716, 718, 719
    See application file for complete search history.

(56) References Cited

U.S. PATENT DOCUMENTS

| 4,138,897 A * | 2/1979 | Ross | F02G 1/044 123/58.2 |
| 4,255,929 A * | 3/1981 | Frosch | F02G 1/044 60/517 |

(Continued)

FOREIGN PATENT DOCUMENTS

| CN | 103282622 A | 9/2013 |
| DE | 3109908 A1 | 2/1983 |

(Continued)

OTHER PUBLICATIONS

Japanese Notice of Allowance, dated Oct. 23, 2018, 2 pages.
(Continued)

*Primary Examiner* — George C Jin
*Assistant Examiner* — Teuta B Holbrook
(74) *Attorney, Agent, or Firm* — Westman, Champlin & Koehler, P.A.

(57) ABSTRACT

The invention relates to a power unit, in particular for a hybrid vehicle, comprising a reciprocating piston engine and comprising a generator which can be in driving engagement therewith, wherein the reciprocating piston engine has at least two pistons, which are guided in at least two cylinders in tandem arrangement, and two counter-rotating crankshafts, which are connected to the pistons by connecting rods and which are mechanically coupled so as to be in phase, wherein a first generator can be driven by the first crankshaft and a second generator can be driven by the second crankshaft.

6 Claims, 4 Drawing Sheets

(51) Int. Cl.
*F01B 1/10* (2006.01)
*F02B 75/22* (2006.01)
*B60K 6/24* (2007.10)
*F02B 75/18* (2006.01)

(52) U.S. Cl.
CPC .............. *F02B 75/18* (2013.01); *F02B 75/22* (2013.01); *F02B 75/225* (2013.01); *F02B 75/228* (2013.01); *F02B 2075/1808* (2013.01)

(56) References Cited

U.S. PATENT DOCUMENTS

| | | | | |
|---|---|---|---|---|
| 5,553,585 | A * | 9/1996 | Paro | F16J 10/04 123/193.2 |
| 6,234,127 | B1 * | 5/2001 | Simpson | F16F 15/1204 123/192.2 |
| 6,895,919 | B1 * | 5/2005 | Taxon | F02B 75/06 123/192.2 |
| 9,103,276 | B2 | 8/2015 | Obrist et al. | |
| 2006/0243236 | A1 * | 11/2006 | Okamoto | F01L 1/022 123/90.31 |
| 2006/0278181 | A1 * | 12/2006 | Park | F02B 75/225 123/52.4 |
| 2006/0283186 | A1 | 12/2006 | McConaghy | |
| 2008/0027620 | A1 | 1/2008 | Feuerlinger et al. | |
| 2009/0107426 | A1 | 4/2009 | Berger et al. | |
| 2013/0199463 | A1 * | 8/2013 | Pischinger | B60L 50/16 123/2 |
| 2013/0319349 | A1 * | 12/2013 | Obrist | B60K 6/24 123/2 |
| 2013/0340726 | A1 * | 12/2013 | Kach | F04C 23/006 123/559.1 |
| 2018/0030889 | A1 * | 2/2018 | Yoshizawa | F01B 1/10 |

FOREIGN PATENT DOCUMENTS

| | | |
|---|---|---|
| DE | 43 32 378 A1 | 3/1995 |
| DE | 102006033270 A1 | 1/2008 |
| EP | 682 881 A | 11/1952 |
| GB | 682 881 A | 11/1952 |
| JP | S57-140525 A | 8/1982 |
| JP | 52-22605 B2 | 6/2013 |
| JP | 2013-534586 A | 9/2013 |
| JP | 2013-545920 A | 12/2013 |
| JP | 2014-152609 A | 8/2014 |
| JP | 62-41939 B2 | 12/2017 |
| KR | 10-2013-0117796 A | 10/2013 |
| WO | 2012/056275 A1 | 5/2012 |
| WO | 2012/163902 A1 | 12/2012 |
| WO | 2013/137858 A2 | 9/2013 |

OTHER PUBLICATIONS

International Search Report (English translation) and Written Opinion (in German) for International Application No. PCT/EP2015/072197, dated Jan. 4, 2016, 8 pages.
German Search Report for German Patent Application No. 10 2014 115 042.2, dated May 15, 2017, 9 pages.
International Preliminary Report on Patentability for PCT/EP2015/072197, dated Apr. 27, 2017, 8 pages.
USPTO issued prosecution history for U.S. Appl. No. 15/518,628, filed Apr. 12, 2017, including: Notice of Allowance and Fees Due (PTOL-85) and Examiner Initiated interview summary (PTOL-413B), dated Jul. 17, 2018, 11 pages; 11 total pages.
Office Action, including Search Report, for Chinese Patent Application No. 201580068282.1, dated Jan. 11, 2019, 8 pages.
Office Action for Korean Patent Application No. 10-2017-7013226, dated Oct. 21, 2019, 12 pages.

* cited by examiner

POWER UNIT

CROSS REFERENCE TO RELATED APPLICATION(S)

This Application is a continuation of U.S. application Ser. No. 15/518,628, filed on Apr. 12, 2017, which published as U.S. Publication No. 2017/0226925 A1 on Aug. 10, 2017, which is a Section 371 National Stage Application of International Application No. PCT/EP2015/072197, filed 28 Sep. 2015 and published as WO 2016/058810 A1 on 21 Apr. 2016, in German, the contents of which are hereby incorporated by reference in their entirety.

SUMMARY

The invention relates to a power unit, in particular for a hybrid vehicle, comprising a reciprocating piston engine and comprising at least one generator which can be in driving engagement therewith, wherein the reciprocating piston engine has at least two pistons, which are guided in at least two cylinders in tandem arrangement, and two crankshafts driven in counter-rotation, which are connected to the pistons by connecting rods and which are mechanically coupled so as to be in phase.

BACKGROUND

WO 2012/056 275 A1 discloses a machine combination comprising an internal combustion engine and a generator for charging the battery of a hybrid drive. The internal combustion engine is designed as a pair of cylinder-piston units, wherein each of the two pistons is in driving engagement with its own crankshaft via connecting rods. The generator arranged in series with the cylinder-piston units is driven by the crankshafts.

One object of the invention is to improve a power unit of the design mentioned in the introduction so that a particularly quiet—low-noise and vibration-free—functioning both of the engine and of the unit as a whole can be achieved, and, besides a particularly simple and particularly space-saving structure, a design with low friction losses and low susceptibility to wear can be achieved in addition, which is particularly suitable for the interval operation of a hybrid drive. A further object of the invention is to specify a vehicle comprising a power unit of this type.

This object is achieved in accordance with the invention by the subject matter of claim 1 in respect of the power unit and by the subject matter of claim 4 in respect of the vehicle.

The invention is based on the principle of specifying a power unit, in particular for a hybrid vehicle, comprising a reciprocating piston engine and comprising a generator which can be in driving engagement therewith. The reciprocating piston engine has at least two pistons, which are guided in at least two cylinders in tandem arrangement. The reciprocating piston engine also has two counter-rotating crankshafts, which are connected to the pistons by connecting rods and which are mechanically coupled so as to be in phase. In accordance with the invention a first generator can be driven by the first crankshaft and a second generator can be driven by the second crankshaft.

The use of two generators opens up new possibilities for the balancing free mass forces and vibratory torques so that the smoothness of the piston engine is improved. Smaller generators can also be used.

The generators are preferably connected to the respective crankshafts by a toothed gear mechanism or by a traction means. The connection by a traction means, in particular a traction means which comprises teeth on either side, improves the low-noise operation.

In a preferred embodiment the first generator and the second crankshaft rotate in opposing directions. The second generator and the first crankshaft also rotate in opposing directions. The generators and the crankshafts rotate at a rotational speed ratio of 2:1. The generators each have at least one imbalance and thus serve as balancing shafts. This embodiment has the advantage that the generators assume a dual function. On the one hand they serve to supply power. On the other hand the generators balance second-order mass forces. The generators thus act in accordance with the principle of a Lanchester balancer. If two counterweights are each provided as imbalance, these can be of equal weight or different weight depending on the position of the generator so as to balance an undesired moment about the longitudinal axis of the engine.

In a development of this embodiment each generator has two counterweights, which are distanced from one another in the longitudinal direction of the generator. Specifically, the two counterweights are attached at either axial end of the generator. The two counterweights are each of equal weight. Undesirable moments are balanced by this arrangement.

There are various possibilities for the coupling of the generators to the respective crankshafts. By way of example, the toothed gear mechanism can comprise a toothed crank web, which is engaged or coupled to a drive pinion of the relevant generator. The toothed gear mechanism can alternatively comprise at least one toothed gear, which is connected, for conjoint rotation, to a shaft pin of the corresponding crankshaft, said shaft pin protruding over the main bearing, and which is coupled to a drive pinion of the relevant generator. A chain or a toothed chain or a toothed belt are potential traction means, and are driven by sprockets.

In a preferred embodiment a first traction means connects the first generator to the first crankshaft and a second traction means connects the second generator to the second crankshaft. The traction means are relatively short in this embodiment, which facilitates the guidance thereof.

The generators are preferably arranged on either side adjacent to the crankshafts, wherein the crankshaft axes span a virtual reference plane through the main bearing. The generator axes can be arranged either in the reference plane or outside the reference plane, more specifically between the crankshafts and the upper dead centre of the pistons. The arrangement of the generator shafts in the reference plane or outside the reference plane leads to advantages with regard to the position of installation of the power unit in the engine. The arrangement of the generator axes above the reference plane additionally has the advantage that the engine is relatively narrow.

The crankshafts preferably have counterweights, which are arranged so as to be phase-shifted, so as to balance free mass forces.

In addition—also so as to achieve a more compact design and a reduction of friction losses—the cylinders can be arranged with an inwardly directed offset so that they have a shorter distance from one another compared to that corresponding to the distance between the crankshafts. The offset of the cylinders thus runs in the direction of the anti-thrust side. As a result, the connecting rods at the time of the greatest application of force thus have a somewhat steeper position with respect to the piston/cylinder axis, such that lower forces influencing the piston friction and the cylinder wear occur at the piston or at the cylinders, accordingly.

It is particularly advantageous to operate the reciprocating piston engine with a firing interval of 0° crankshaft angle in 4-stroke operation.

For the synchronisation of the crankshafts it is advantageous that these have toothed crank webs, which are in engagement with one another. Alternatively, a traction means which comprises teeth on either side, in particular a toothed belt which comprises teeth on either side, can be provided for the synchronisation, which traction means couples the two crankshafts to one another, wherein a first side of the toothed belt is in engagement with the first crank web and a second side, in particular a back of the toothed belt, is in engagement with the second crank web. The use of the traction means damps the development of noise. So as to reduce the loading of the tooth pairs, it can be provided that the toothed belt which comprises teeth on either side is wrapped around the first crank web, wherein the toothed belt on either side has 1 to 5 teeth, in particular 4 teeth, more than the toothing of the second crank web. The additional number of teeth allows the toothed belt to be lifted off and allows the toothed gear to be overtaken within the raised toothed belt. For this purpose, the toothed belt should rise radially beyond the addendum circle of the toothed gear by more than the dedendum. The centrifugal force supports this lifting. The motivation for this is the avoidance of the recurrence of the maximum loading on the same teeth of the toothed belt which comprises teeth on either side, for example with a transfer of the firing force in the case of 4-stroke operation with 360° firing interval.

In an alternative embodiment the crankshafts can be coupled so as to be in phase by means of toothed gears, which are in engagement with one another, wherein the toothed gears are arranged between the main bearings of the crankshafts or on the shaft pins of the crankshafts, said shaft pins protruding over the respective main bearings. The toothed gears can be spur gears having straight teeth or helical teeth or tensioned toothed gears (scissor gears or hunting gears). In the case of an embodiment of the reciprocating piston engine with four pistons, a square-four arrangement can prove to be particularly advantageous if two pistons in each case are connected to the same crankshaft with a crank pin offset of 270° by connecting rods. In other words, a tandem arrangement of the cylinders is doubled, such that the aforementioned square-four arrangement is provided, wherein two cylinders per crankshaft are arranged in series in each case. A crankshaft with 270° crank pin offset does not generate any second-order mass forces, but instead second-order moments, which act in the cylinder axis plane. With the top dead centre being reached simultaneously by diagonally opposite pistons of the "square four", the moments of both crankshafts therefore cancel out one another. There is thus no need for any further balancing measures for the second-order forces or moments.

The arrangement of the cylinders—both in tandem and in square-four form—can be parallel to one another or inclined relative to one another with an angle of inclination between 1° and 15°, preferably between 4° and 8°, per cylinder.

In a further variant of the invention it is provided that each cylinder is in fluid connection with an outlet channel, wherein the outlet channels of the cylinders open into a common central exhaust gas channel. The outlet channels can have identical lengths. The central exhaust gas channel is preferably arranged in an engine central plane. The engine central plane runs between the cylinders parallel to the crankshaft axes and is arranged at the same distance from each of the crankshaft axes. Due to this design of the outlet channels, the distance between the cylinders, in particular the outlet valves, and an auxiliary unit, for example a turbine of a turbocharger, advantageously can be made relatively short. A relatively large amount of the available enthalpy can thus be made available for the operation of the auxiliary unit. In addition, it is possible to do away with a conventional, relatively heavy exhaust manifold. This reduces the weight of the reciprocating piston engine. The complex connection of the exhaust manifold to the cylinder head can also be avoided, and the cylinder head is therefore constructed in a compact manner. An air-gap-insulated port liner can be arranged in the central exhaust gas channel A turbocharger can be connected directly to the central exhaust gas channel. Said turbocharger is in this way operated with a high efficiency and increases the performance of the reciprocating piston engine.

The invention will be explained in greater detail hereinafter on the basis of exemplary embodiments with reference to the accompanying schematic drawings.

DETAILED DESCRIPTION OF THE EMBODIMENTS

Figure 1:
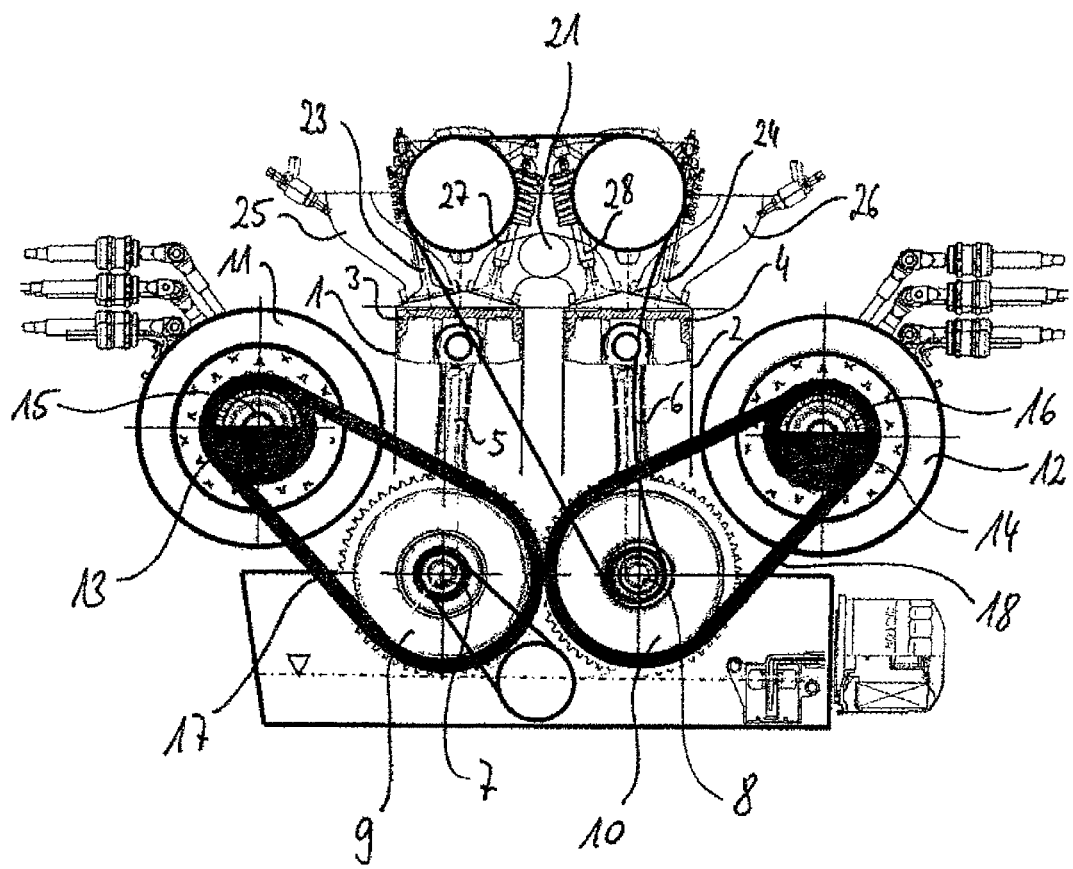
FIG. 1 shows a front view of a power unit with generators arranged in a V shape.
Figure 2:
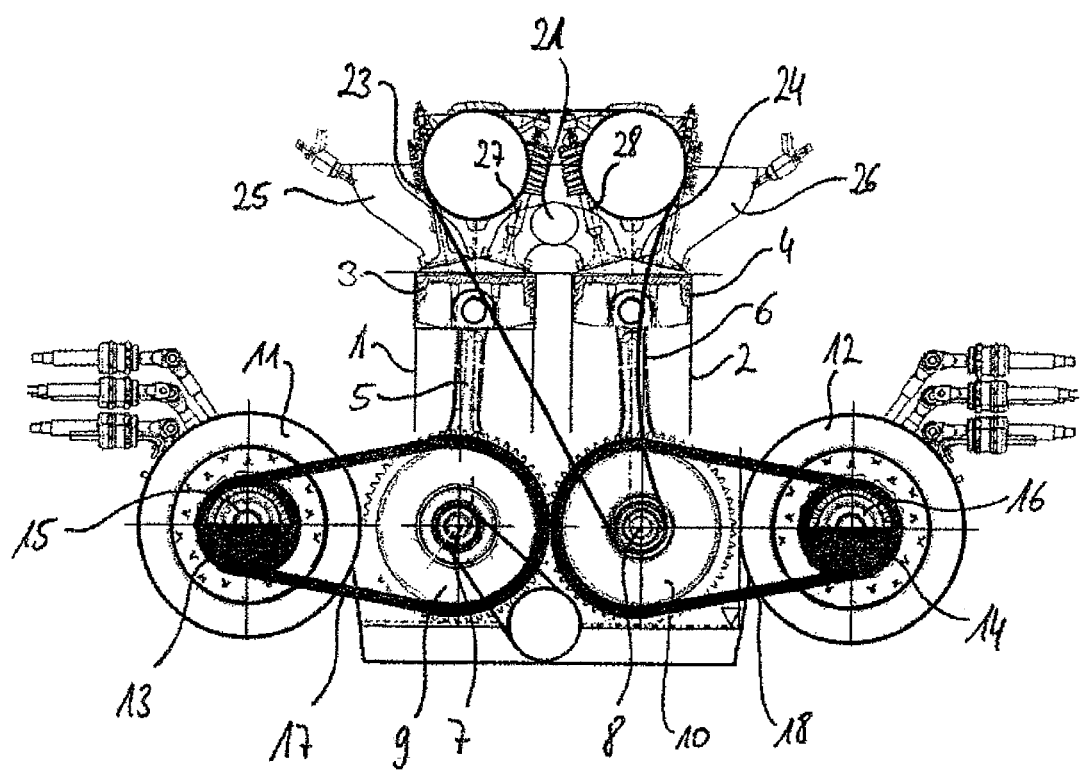
FIG. 2 shows a front view of a power unit in accordance with an exemplary embodiment according to the invention with horizontally arranged generators.

The schematically illustrated power unit in accordance with the exemplary embodiments according to the invention according to FIGS. 1 and 2 has two cylinders 1 and 2 arranged in tandem form (see FIG. 1), in which pistons are guided and which each drive a crankshaft 7 and 8 for example in four-stroke operation via connecting rods 5 and 6. Toothed gears 9 and 10 (see FIG. 2) are arranged on the crankshafts 7, 8 and are in engagement with each other and thus ensure a counter-rotation of the crankshafts 7 and 8 mechanically coupled to one another so as to be in phase. The toothed gears 9 and 10 are preferably arranged between the main bearings of the crankshafts (main bearings not illustrated) or on shaft pins (likewise not illustrated in the drawing) of the crankshaft, said shaft pins protruding over the respective main bearings. The toothed gears can be embodied as spur gears having straight teeth or helical teeth, or can also be embodied as tensioned toothed gears.

Figure 4:
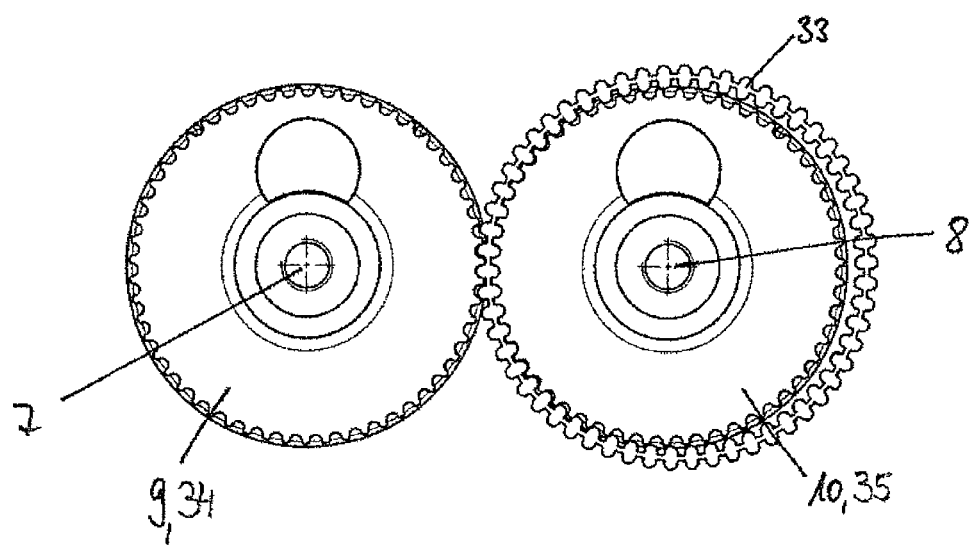
FIG. 4 shows a schematic illustration of the low-noise crankshafts coupled via a toothed belt which comprises teeth on either side.

Alternatively, the drive coupling of the crankshafts 7 and 8 can also be provided via toothed crank webs, which are directly engaged with one another for coupling of the crankshafts 7 and 8. A further alternative schematically illustrated in FIG. 4 is that of coupling of the crankshafts via a toothed belt 33 which comprises teeth on either side, wherein it is particularly advantageous, for wear reduction and for smooth running, to provide the toothing of the toothed belt 33 with a different number of teeth compared with the toothing of the toothed gears 9, 10. In particular, the toothed belt 33 can have 1 to 5, preferably 4, teeth more on either side than the toothed gears 9 and 10 of the crankshafts 7 and 8. As a result, different teeth of the toothed belt 33 are in engagement with the teeth of the toothed gears 9 and 10 of the crankshafts 7 and 8 in each of the dead centres of the course of the piston. Gas exchange forces are thus prevented from always acting on the same tooth pairing. It is also possible to use the toothed belt 33 which comprises teeth on either side in conjunction with toothed crank webs 34, 35 for low-noise coupling of the crankshafts 7, 8.

The drawing, however, does not show that the cylinders arranged with axes parallel to one another according to FIG. 1 have an inwardly directed offset, such that the distance between the cylinder axes is slightly smaller than the distance between the axes of the two crankshafts 7 and 8, however this is readily comprehensible for a person skilled in the art. With this arrangement of the cylinders offset on the anti-thrust side, not only is a compact design achieved, but in particular there is also a smaller introduction of force into the pistons and therefore an easier and wear-reducing movement of the pistons in the cylinders via the connecting rods 5 and 6 and different or smaller inclined position thereof during operation on account of the offset.

The exemplary embodiments according to FIGS. 1 and 2 differ in the arrangement of the two generators. According to FIG. 1, the generators 11, 12 are arranged in a V shape together with the corresponding crankshafts 7, 8, wherein the distance between the central axes of the generators 11, 12 is greater than the distance between the axes of the crankshafts 7, 8. In FIG. 2 the generators 11, 12 are arranged in the same horizontal plane as the crankshafts 7, 8. The explanations above and hereinafter with regard to the structure of the reciprocating piston engine apply to both embodiments.

The generators 11, 12 are each characterised in that they have balancing weights 13, 14. The balancing weights 13, 14 are arranged at the same angle, i.e. not rotated relative to one another, in the upper dead centre position of the pistons 3, 4, as can be seen in the drawings. The balancing weights 13, 14 are integrated in the driveshafts or the drive pinions 15, 16 of the two generators 11, 12. By way of example, this can be implemented by excentrically arranged weights, which are connected to the corresponding drive pinion 15, 16 or the driveshaft. Not illustrated in the drawings are counterweights arranged in a complementary manner on the other generator side, which serve to balance moments about the transverse axis of the reciprocating piston engine. The balancing weights 13, 14 balance the second-order mass forces, whereby the smoothness of the reciprocating piston engine is significantly improved. The drive of the two generators 11, 12 is provided by toothed belts or generally traction means 17, 18, which are in engagement either with a crank web in the corresponding crankshaft 7, 8 on the one hand and with the drive pinion 15, 16 of the corresponding generator 11, 12 on the other hand. Instead of the toothed crank webs, sprockets can also be connected to the crankshafts for conjoint rotation and ensure a transfer of the moments to the traction means.

The drive of the camshafts illustrated in FIG. 1 is provided by an output gear connected to the second crankshaft 8, which output gear is connected via a traction means to the two camshafts. Furthermore, an oil pump is provided, which is driven by the other crankshaft, i.e. the first crankshaft 7, more specifically by a traction means.

The above comments apply accordingly to the exemplary embodiment according to FIG. 2.

Figure 3:
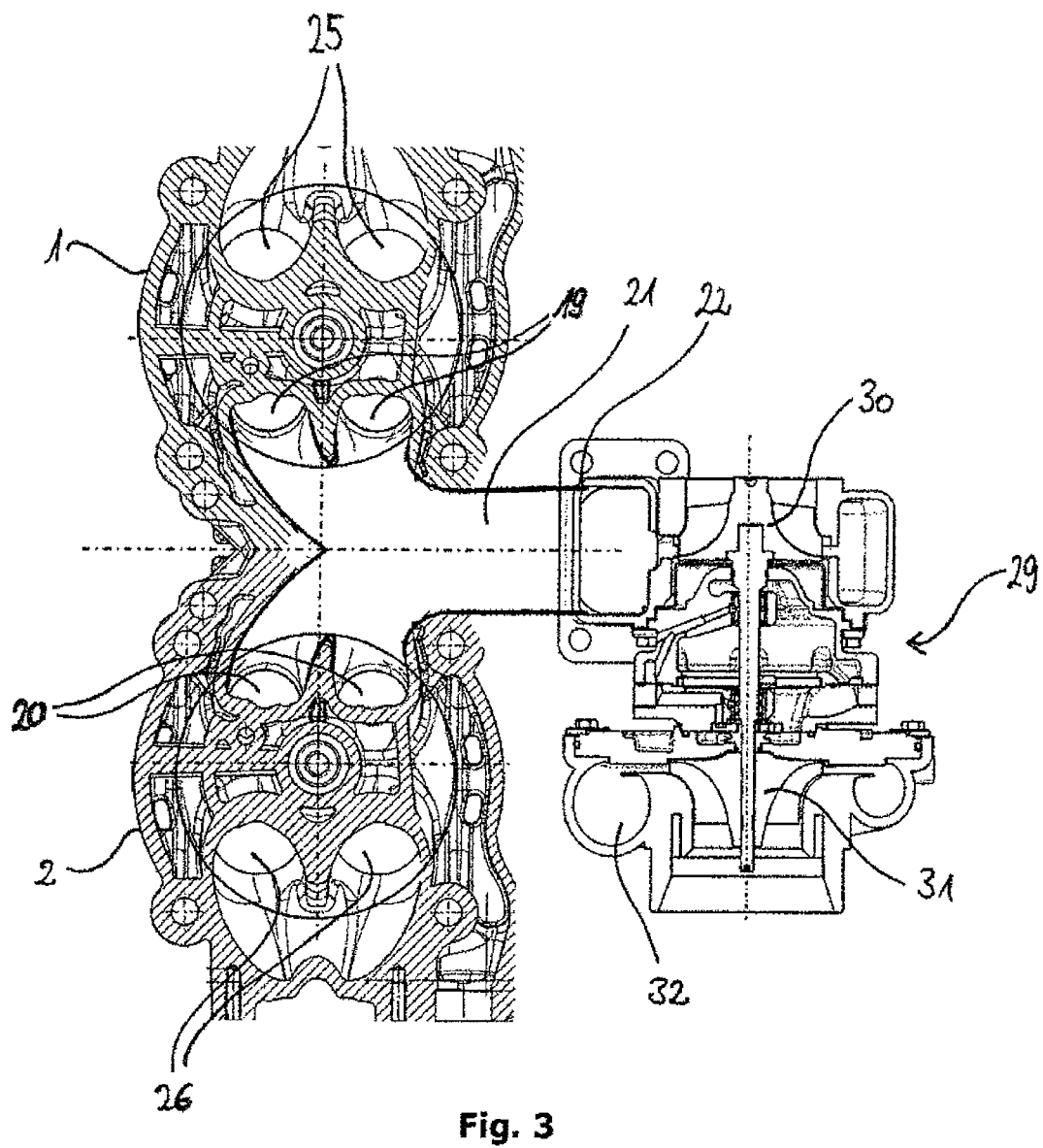
FIG. 3 shows a sectional view of the cylinder head of the power unit according to FIG. 1 or FIG. 2 with a turbocharger.

Both power units formed in accordance with the exemplary embodiments shown in FIGS. 1 and 2 can have outlet channels 19, 20 in the region of cylinder heads of the reciprocating piston engine, which outlet channels are in fluid connection with the cylinders 1, 2. The outlet channels 19, 20 can open into a common exhaust gas channel 21. The exemplary arrangement of the outlet channels 19, 20 and of the exhaust gas channel 21 is illustrated in FIG. 3.

The outlet channels 19, 20 each have identical lengths, such that the exhaust gas channel 21 is arranged substantially centrally between the cylinders 1, 2 or centrally between cylinder heads of the cylinders 1, 2. Inlet valves 23, 24 are arranged in each cylinder head and control the inflow of a fuel mixture from inlet channels 25, 26 into the cylinders 1, 2. Outlet valves 27, 28 are associated with the outlet channels 19, 20 and control the outflow of a combustion gas mixture from the cylinders 1, 2 into the outlet channels 19, 20 and thus further on into the exhaust gas channel. The exhaust gas channel 21 ends at a channel exit 22.

A turbocharger 29 can be connected to the channel exit 22. The turbocharger is preferably flange-mounted directly onto the channel exit 22. A turbine 30 of the turbocharger 29 here lies in the outlet flow of the combustion gas flowing out from the exhaust gas channel 21 and drives a compressor 31, which is arranged in an air-guiding channel 32 of the reciprocating piston engine.

LIST OF REFERENCE SIGNS 1, 2 cylinders
3, 4 pistons
5, 6 connecting rods
7, 8 crankshafts
9, 10 toothed gears
11, 12 generators
13, 14 balancing weights
15, 16 drive pinions
17, 18 traction means
19, 20 outlet channels
21 exhaust gas channel
22 channel exit
23, 24 inlet valves
25, 26 inlet channels
27, 28 outlet valves
29 turbocharger
30 turbine
31 compressor
32 air-guiding channel
33 toothed belt
34, 35 crank webs

The invention claimed is:

1. A power unit, in particular for a hybrid vehicle, comprising:
   a reciprocating piston engine and comprising a generator which can be in driving engagement therewith, wherein the reciprocating piston engine has at least two pistons, which are guided in at least two cylinders in tandem arrangement, and two counter-rotating crankshafts, which are connected to the pistons by connecting rods and which are mechanically coupled so as to be in phase, and
   a generator is driven by the first crankshaft, wherein the generator comprises at least one imbalance and acts as balancing shaft, and a balancing shaft is driven by the second crankshaft, wherein the balancing shaft comprises at least one imbalance, wherein the generator and the balancing shaft are connected to the respective crankshafts by a toothed gear mechanism or by a traction means, wherein the generator and the second crankshaft as well as the balancing shaft and the first crankshaft in each case rotate in opposing directions at a rotational speed ratio of 2:1.

2. A vehicle, in particular hybrid vehicle, comprising a power unit according to claim 1.

3. A power unit, in particular for a hybrid vehicle, comprising:

a reciprocating piston engine and comprising a generator which can be in driving engagement therewith, wherein the reciprocating piston engine has at least two pistons, which are guided in at least two cylinders in tandem arrangement, and two counter-rotating crankshafts, which are connected to the pistons by connecting rods and which are mechanically coupled so as to be in phase, and a first generator is driven by the first crankshaft, wherein the generator comprises at least one imbalance and acts as balancing shaft, and a second generator is driven by the second crankshaft, wherein the second generator is a balancing shaft which comprises at least one imbalance, wherein the generator and the balancing shaft are connected to the respective crankshafts by a toothed gear mechanism or by a traction means, wherein the generator and the second crankshaft as well as the balancing shaft and the first crankshaft in each case rotate in opposing directions at a rotational speed ratio of 2:1.

4. A vehicle, in particular hybrid vehicle, comprising a power unit according to claim 3.

5. A power unit, in particular for a hybrid vehicle, comprising:

a reciprocating piston engine and comprising a generator which can be in driving engagement therewith, wherein the reciprocating piston engine has at least two pistons, which are guided in at least two cylinders in tandem arrangement, and two counter-rotating crankshafts, which are connected to the pistons by connecting rods and which are mechanically coupled so as to be in phase, and a first generator is driven by the first crankshaft, wherein the generator comprises at least one imbalance and acts as balancing shaft, and a second generator is driven by the second crankshaft, wherein the second generator is replaced by a balancing shaft which comprises at least one imbalance, wherein the generator and the balancing shaft are connected to the respective crankshafts by a toothed gear mechanism or by a traction means, wherein the generator and the second crankshaft as well as the balancing shaft and the first crankshaft in each case rotate in opposing directions at a rotational speed ratio of 2:1.

6. A vehicle, in particular hybrid vehicle, comprising a power unit according to claim 5.

\* \* \* \* \*